UNITED STATES PATENT OFFICE.

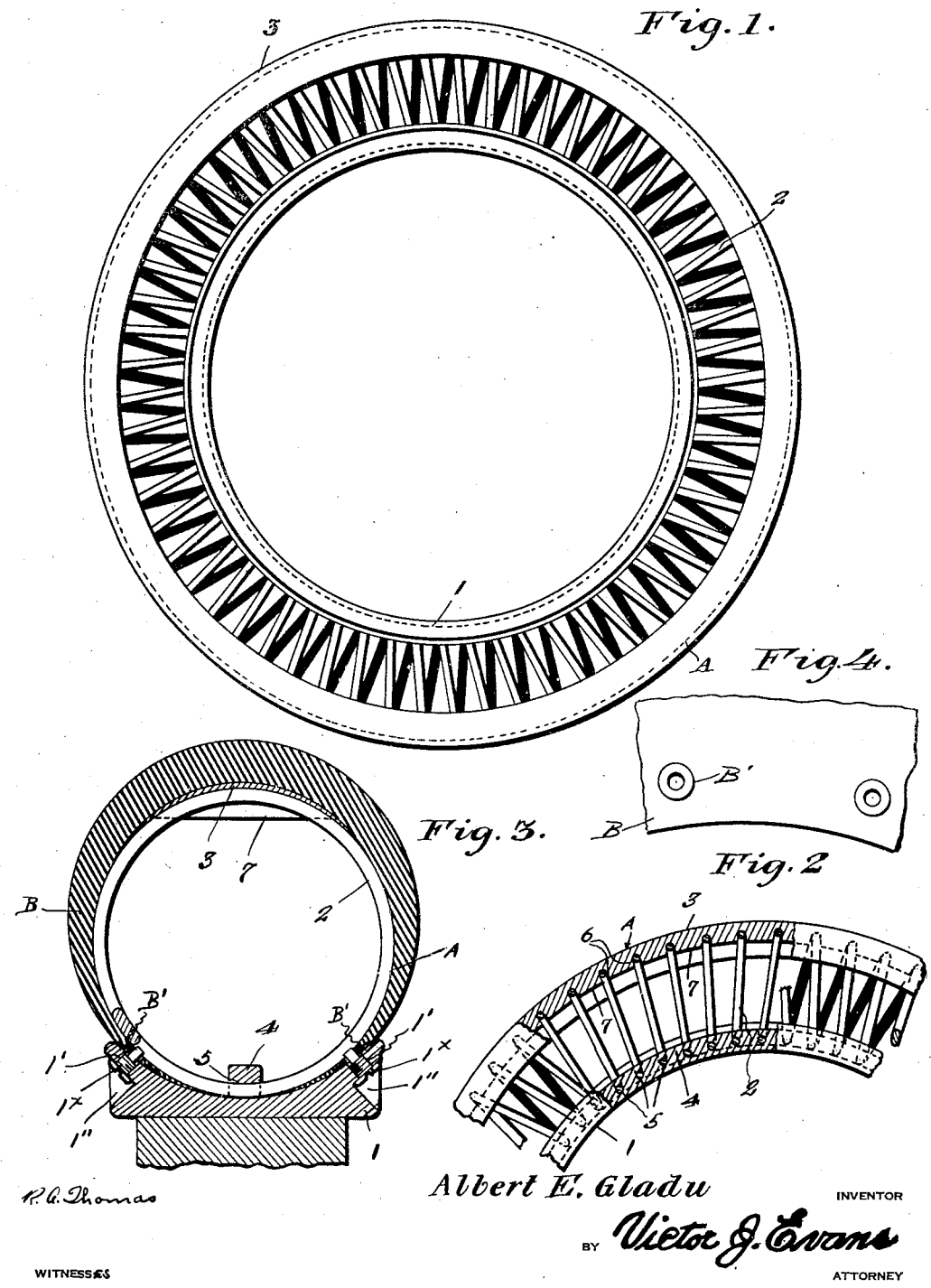

ALBERT E. GLADU, OF LYNN, MASSACHUSETTS.

RESILIENT TIRE.

1,404,111.  Specification of Letters Patent.  Patented Jan. 17, 1922.

Application filed April 23, 1921. Serial No. 464,008.

*To all whom it may concern:*

Be it known that I, ALBERT E. GLADU, a citizen of the United States, residing at Lynn, in the county of Essex and State of Massachusetts, have invented new and useful Improvements in Resilient Tires, of of which the following is a specification.

This invention relates to improvements in vehicle tires of the cushion type, the principal object of the invention being to substitute spring means for the pneumatic tube so as to eliminate punctures and blowouts while securing a maximum degree of resiliency.

Another object of the invention is to provide a rim portion with means for securing the spring means thereto and a tread portion with means for securing the same to the spring means.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view showing my improvement in place on a rim but with the shoe removed.

Figure 2 is a fragmentary longitudinal sectional view of Figure 1.

Figure 3 is a transverse sectional view showing a portion of the wheel and a shoe.

Figure 4 is a fragmentary view of a portion of the shoe.

In these views 1 indicates the rim of a wheel which is of substantially trough shape in cross section and has each side provided with a plurality of threaded openings 1' opening out into recesses 1'', these openings being adapted to receive threaded screws 1$^x$ having reduced ends and enlarged heads. The shoe has its edges tapering off, instead of having the usual beads thereon, so that the inner part of the shoe will conform to the outer face of the rim 1, as clearly shown in Figure 3. The shoe is provided with eyelets B' which are adapted to receive the reduced ends of the screws so that the shoe will be held on the rim.

The usual inner tube is replaced by the member A which consists of the coil spring 2, the tread part 3 and the strip 4 which secures the coil spring to the rim. The tread part 3 is of semi-circular shape in cross section, the coil being of circular shape in cross section and strip 4 is provided with holes 5 for receiving the convolutions of the spring 2. The inner face of the tread part 3 is also provided with grooves 6 to receive the convolutions of the spring 2 and web parts 7 are arranged between the grooves and separate the convolutions of the springs. These webs and grooves prevent any possible circumferential spreading of the convolutions so that the member 2 is prevented from collapsing by the spreading of the coils and thus a solid continuous body is provided to carry the weight of the vehicle. The strip 4 is preferably formed with the rim 1 and the convolutions of the spring are threaded through the holes therein or the said strip 4 may be provided with slots to receive the convolutions of the spring and these slots are filled in any desired manner after the spring is in place. If the spring is threaded through the holes it will of course be understood that this must be done before the ends of the spring are secured together. As shown in Figure 3 the tapered inner parts of the shoe are held between the spring and the rim and the edges of the shoe are prevented from moving outwardly from between the parts by the screws or bolts.

From the above it will be apparent that I have produced a tire which has a great degree of resiliency and is both puncture and blow-out proof and the convolutions of the member 2 are so supported that spreading or creeping of said member upon the rim is prevented.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In combination with a wheel having a rim of trough shape in cross section, a shoe having tapered edges resting on said rim, a circular coiled spring in the shoe and having its inner parts pressing the tapered edges of the shoe against the rim, means for preventing creeping of the spring and means for holding the tapered edges of the shoe against movement on the rim.

In testimony whereof I affix my signature.

ALBERT E. GLADU.